(12) United States Patent
Baudouin et al.

(10) Patent No.: US 12,162,441 B2
(45) Date of Patent: Dec. 10, 2024

(54) TELESCOPIC CLEANING DEVICE FOR MOTOR VEHICLE

(71) Applicant: Valeo Systemes d'Essuyage, La Verriere (FR)

(72) Inventors: Maxime Baudouin, La Verriere (FR); Jordan Vieille, La Verriere (FR); Jean-Francois Rousseau, La Verriere (FR); Philippe Picot, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 777 days.

(21) Appl. No.: 17/251,111

(22) PCT Filed: Jun. 12, 2019

(86) PCT No.: PCT/EP2019/065362
§ 371 (c)(1),
(2) Date: Dec. 11, 2020

(87) PCT Pub. No.: WO2019/238764
PCT Pub. Date: Dec. 19, 2019

(65) Prior Publication Data
US 2021/0253068 A1 Aug. 19, 2021

(30) Foreign Application Priority Data
Jun. 14, 2018 (FR) ..................................... 1855241

(51) Int. Cl.
*B60S 1/56* (2006.01)
*B60S 1/52* (2006.01)
*B60S 1/54* (2006.01)

(52) U.S. Cl.
CPC ................ *B60S 1/56* (2013.01); *B60S 1/528* (2013.01); *B60S 1/544* (2013.01)

(58) Field of Classification Search
CPC ............. B60S 1/56; B60S 1/528; B60S 1/544
See application file for complete search history.

(56) References Cited

U.S. PATENT DOCUMENTS 5,657,929 A 8/1997 Dewitt et al.
6,199,773 B1 3/2001 Holt et al.
(Continued)

FOREIGN PATENT DOCUMENTS

CN 104470771 A 3/2015
CN 106427895 A 2/2017
(Continued)

OTHER PUBLICATIONS

European Patent Office, International Search Report and Written Opinion for corresponding International Application No. PCT/EP2019/065362, dated Jun. 12, 2019 (ISR includes English translation).
(Continued)

*Primary Examiner* — Natasha N Campbell
(74) *Attorney, Agent, or Firm* — Valeo Systemes d'Essuyage

(57) ABSTRACT

The invention relates to a telescopic cleaning device intended to spray at least a first fluid and at least a second fluid toward an exterior surface of a motor vehicle's sensor/emitter, the telescopic cleaning device including at least a first distribution orifice for a first fluid and at least a second distribution orifice for a second fluid, the telescopic cleaning device being configured to deploy along a deployment (D) axis where the first distribution orifice and the second distribution orifice are offset from one another along the cleaning device's axis of deployment (D).

10 Claims, 5 Drawing Sheets

(56) References Cited

U.S. PATENT DOCUMENTS

| | | |
|---|---|---|
| 6,554,210 B2 | 4/2003 | Holt et al. |
| 9,505,382 B2 | 11/2016 | Gokan |
| 10,457,253 B2 | 10/2019 | Trebouet et al. |
| 10,569,747 B2 | 2/2020 | Trebouet et al. |
| 2015/0172582 A1 | 6/2015 | Kiyohara |
| 2016/0282865 A1 | 9/2016 | Shimizu et al. |
| 2017/0210304 A1 | 7/2017 | Davies et al. |
| 2018/0086318 A1 | 3/2018 | Grasso |
| 2021/0284101 A1 | 9/2021 | Grasso et al. |

FOREIGN PATENT DOCUMENTS

| | | |
|---|---|---|
| CN | 106809175 A | 6/2017 |
| DE | 102014213282 A1 | 1/2016 |
| JP | 2003532511 A | 11/2003 |
| JP | 2016179767 A | 10/2016 |
| JP | 2017128181 A | 7/2017 |
| JP | 2017128281 A | 7/2017 |
| WO | 2017169140 A1 | 10/2017 |
| WO | 2018019662 A1 | 2/2018 |
| WO | 2018059770 A1 | 4/2018 |
| WO | 2018059802 A1 | 4/2018 |

OTHER PUBLICATIONS

Japanese Patent Office, Notice of Refusal (OA1) including English translation, for corresponding Japanese Patent Application No. JP2020-569103, dated Jan. 4, 2022.

Chinese Patent Office, First Office Action of corresponding Chinese Application No. 201980039986.4, dated Mar. 23, 2023.

TELESCOPIC CLEANING DEVICE FOR MOTOR VEHICLE

CROSS-REFERENCE TO RELATED APPLICATIONS

This application is filed under 35 U.S.C. § 371 U.S. National Phase of International Application No. PCT/EP2019/065362 filed Jun. 12, 2019 (published as WO2019238764), which claims foreign priority benefit to French application No. 1855241 filed on Jun. 14, 2018, the disclosures of which are incorporated herein by reference in their entirety.

TECHNICAL FIELD

The field of the present invention is that of cleaning systems intended for motor vehicles, and more particularly cleaning systems intended for cleaning driving aid systems with which such vehicles are equipped.

The most recent motor vehicles are equipped with a collection of driving aid systems that assist the driver or replace the driver in certain maneuvers. These driving aid systems are operated on the basis of information detected by one or more sensors/emitters. It is important in this context for each sensor/letter to be perfectly clean, so that there is no risk of non-triggering or ill-timed triggering of the system.

BACKGROUND

The most recent motor vehicles are equipped with a collection of driving aid systems that assist the driver or replace the driver in certain maneuvers. These driving aid systems are operated on the basis of information detected by one or more sensors/emitters. It is important in this context for each sensor/letter to be perfectly clean, so that there is no risk of non-triggering or ill-timed triggering of the system.

It is known practice to clean the sensors/emitters of this type using a cleaning product sprayed by a spray device. The cleaning product is able to dissolve the dirt on the sensor/emitter. Nevertheless, the subsequent drying of the cleaning products leaves a residue on the lens of the camera and may adversely alter the image and bring about ill-timed and dangerous triggering of the system with which the sensor/emitter is associated.

Cleaning devices in which, in addition to a cleaning liquid sprayed first of all onto the optical surface to clean this optical surface and expel dirt, there is also provision to spray onto the optical surface a drying fluid, for example air, are therefore known. Thus, just after a cycle of cleaning by spraying liquid from the distribution endpiece arranged at the end of the cleaning device, air is transported to this distribution endpiece and then sprayed onto the optical surface. This succession of operations allows high-performance cleaning of the optical sensor/emitter.

One solution that is easy to implement is to provide two distinct devices, one for the cleaning liquid and one for the drying fluid, and to operate one and then the other in succession. However, it will be appreciated that such an embodiment is bulky and that a more compact solution could be sought.

Devices in which the one same distribution endpiece is used for spraying onto the one same optical surface on the one hand, cleaning liquid and on the other hand, pressurized air particularly in order to form a drying fluid, are known. More specifically, these cleaning systems may be telescopic inasmuch as the distribution endpiece is arranged at the end of a body that can be deployed in a translational movement between two positions one of which is a retracted position in which the endpiece is stowed within the volume of an element of the bodywork of the vehicle in the vicinity of the optical surface of the sensor/emitter, and a deployed position in which the spray nozzles for cleaning liquid and for air are facing this optical surface.

SUMMARY

According to exemplary embodiments, the endpiece may comprise two spray nozzles arranged side-by-side and used respectively for spraying one of the fluids, or else may comprise a single spray nozzle with the cleaning fluid and air being passed alternatively through this single nozzle.

The associated cleaning process may notably consist in deploying the telescopic device then spraying cleaning fluid while the device is in the deployed position, then spraying air to dry the cleaning liquid as the device effects its return travel from the deployed position toward the retracted position.

One of the disadvantages of the current systems lies in the fact that systems for detecting the presence of water and/or of dirt on the sensors/emitters are able to detect the presence of a foreign element on the sensor/emitter but not to distinguish its type. For example, such systems cannot distinguish between a water droplet and dust. Now, there are situations in which spraying air is enough to clean the sensor/emitter, for example in order to dry these sensors/emitters in rainy weather. As a result, cleaning these sensors/emitters in such situations involves needless consumption of cleaning liquid.

The present invention falls within this context in that it proposes a telescopic cleaning device able to spray only air or to spray air and a cleaning fluid in order to adapt the cleaning of the sensor/emitter to suit each situation, and thus make savings on the quantities of cleaning liquid used and avoid unnecessary deployment of the telescopic device. Advantageously, the present invention also allows a pre-cleaning to be carried out before cleaning liquid is sprayed, so as to optimize cleaning.

One subject of the present invention thus relates to a telescopic cleaning device, intended to spray at least a first fluid and at least the second fluid toward an exterior surface of a sensor/emitter of a motor vehicle, the telescopic cleaning device comprising a distribution endpiece in which at least a first distribution orifice for the first fluid and at least a second distribution orifice for the second fluid are arranged, the telescopic cleaning device being configured to deploy along an axis of deployment, between a retracted first position and a deployed second position. According to the invention, the first distribution orifice and the second distribution orifice are offset from one another along the axis of deployment of the cleaning device.

Thus, the telescopic cleaning device is peculiar in that the distribution endpiece comprises two spray nozzles, or distribution orifices, arranged in two stages along the direction of deployment of the telescopic device.

More specifically, the distribution orifices extend at different distances from the end of the body that bears the distribution endpiece with the distribution orifice that sprays air at a longer distance from this end of the body than the distance at which the distribution orifice that sprays cleaning liquid is situated.

That way, when the telescopic cleaning device is in the retracted position, the cleaning-liquid outlet can be concealed beneath the bodywork surface in which the surface to be cleaned lies, and the air outlet is operational.

According to one feature of the invention, an offset measured between the first distribution orifice and the second distribution orifice, parallel to the axis of deployment of the telescopic cleaning device, is non-zero. For example, this offset may be comprised between two and thirty millimeters.

According to one feature of the present invention, the telescopic cleaning device is configured to deploy between a first position and a second position, the first position corresponding to a retracted position in which only the first distribution orifice is uncovered and free, and the second position corresponding to a deployed position in which the first distribution orifice and the second distribution orifice are uncovered and free. In other words, the telescopic cleaning device in its first position is configured to spray only the first fluid whereas the telescopic cleaning device in its second position is configured to be able to spray the first fluid and/or the second fluid. For example, the first position of the telescopic cleaning device corresponds to a retracted position of the cleaning device with the distribution head partially withdrawn into the bodywork element of which the distribution head may project, whereas the second position corresponds to a deployed position of this telescopic cleaning device. It will thus be appreciated that the present invention advantageously allows the first fluid to be sprayed whatever the position of the telescopic cleaning device and that the spraying of the second fluid itself requires the telescopic cleaning device to be deployed.

According to one feature of the present invention, the telescopic cleaning device comprises at least a first inlet orifice for the first fluid and at least a second inlet orifice for the second fluid, the first inlet orifice being connected to the first distribution orifice by a first duct and the second inlet orifice being connected to the second distribution orifice by a second duct distinct from the first duct. It will therefore be appreciated that the telescopic cleaning device is configured to comprise two ducts distinct from one another, from the inlet to the distribution, so that the first fluid and the second fluid are never in contact.

According to the invention, the telescopic cleaning device comprises a conveying body which comprises at least one fixed part and one moving part, the distribution endpiece being formed at the end of the moving part.

According to one feature of the present invention, the fixed part of the conveying body comprises at least one elastic return device configured to allow the telescopic cleaning device to retract. According to the invention, a level of compression of this elastic return device is dependent on a quantity of second fluid present in the first portion of the second duct. In other words, the build-up of second fluid in the first portion of the second duct causes compression of the elastic return device which, in turn, causes the moving part of the conveying body of the telescopic cleaning device to slide. Once the second duct is empty of this second fluid, the elastic return device tends to return to an initial position, thus causing the moving part to retract. Advantageously, it will be appreciated that the telescopic cleaning device is thus deployed only when spraying of the second fluid is needed.

For example, the moving part of the conveying body of the telescopic cleaning device according to the invention is produced in such a way that the second portion of the second duct which portion is formed in this moving part is accessible to the second fluid only when the telescopic cleaning device is deployed. In other words, when the telescopic cleaning device is in its first position, the moving part obstructs the second portion of the second duct, and when the telescopic cleaning device is in its second position, the second portion of the second duct is uncovered so that it can receive the second fluid.

Advantageously, at least the second inlet orifice for the second fluid is equipped with a shut-off means configured to adopt at least an open position in which it allows the second fluid to be admitted to the second duct and at least a closed position in which it prevents the second fluid from being admitted to the second duct. More specifically, the shut-off means is configured to allow or prevent admission of second fluid to the first portion of the second duct. It will be appreciated that, when the shut-off means is in its closed position, the telescopic cleaning device is in its first position, and when the shut-off means is in its open position, the first portion of the second duct fills with second fluid thus causing the telescopic cleaning device according to the invention to deploy as far as its second position. Alternatively, the shut-off means may be arranged on an outlet orifice of a reservoir containing the second fluid.

According to features of the invention, the first fluid is compressed air and the second fluid is a cleaning liquid. Further, the first distribution orifice associated with the compressed air is arranged in the distribution endpiece at a greater distance than the second distribution orifice associated with the cleaning liquid is.

In other words, the present invention offers the possibility of blowing air without deploying the telescopic cleaning device. This air is able on the one hand, to dry the exterior surface of the sensor/emitter after this exterior surface has been cleaned, and on the other hand to dry this exterior surface of the sensor/emitter in the event of rain. Advantageously, this air is also able to perform a pre-cleaning of the exterior surface of the sensor/emitter before the telescopic cleaning device is deployed and sprays cleaning liquid. It will therefore be appreciated that the cleaning liquid is sprayed onto the exterior surface of the sensor/emitter only if the pre-cleaning step using air proves insufficient.

According to features of the invention, taken alone or in combination, it will be possible to make provision that:
 the distribution endpiece comprises a spray face facing the optical surface that is to be cleaned and in which the distribution orifices are arranged, and a cover face formed by the axial end face of the endpiece and of the telescopic cleaning device, the spray face being partially withdrawn in the first position in order to leave the first distribution orifice formed in a distal part of the spray face free;
 the first distribution orifice is configured to form a jet of first fluid substantially perpendicular to the axis of deployment of the telescopic cleaning device;
 the second distribution orifice comprises a ramp configured to deflect the jet of second fluid leaving the distribution endpiece toward the surface of the sensor/emitter that is to be cleaned.

The present invention also relates to a motor vehicle equipped with a detection assembly, the motor vehicle comprising at least one telescopic cleaning device according to the invention, the telescopic cleaning device being intended for cleaning an exterior surface of at least one sensor/emitter of the detection assembly.

According to one feature of the present invention, an angle formed between a main direction of spraying of the first fluid and a plane in which the exterior surface of the sensor/emitter predominantly lies is comprised between −10° and 10°. Advantageously, this spray amplitude allows the telescopic cleaning device to be adapted to suit various curvatures of the exterior surface of the sensor/emitter that is to be cleaned.

According to the invention, the detection assembly comprises at least one system for detecting the presence of water and/or of dirt on the exterior surface of its sensor/emitter. For example, this system for detecting the presence of water and/or of dirt may comprise an image analysis means.

Advantageously, the motor vehicle also comprises a control unit configured to operate at least the deployment of the telescopic cleaning device. In other words, the control unit is configured to operate at least the means for shutting off the second inlet orifice for the second fluid. As mentioned previously, it is the admission of this second fluid into the second duct, and more particularly into the first portion of the duct, that allows the cleaning device to deploy.

The invention also relates to a method for cleaning an exterior surface of a sensor/emitter of a detection assembly of a motor vehicle according to the invention, during which a control unit receives the first item of information relating to detection of the presence of water and/or of dirt on the exterior surface of the sensor/emitter, the method comprising, when the first item of information relating to the detection of the presence of water and/or of dirt is positive, at least a first step during which the control unit transmits a first instruction to the telescopic cleaning device so that the latter sprays the first fluid, and at least a second step of checking for the presence of water and/or of dirt on the exterior surface of the sensor/emitter using the detection system. What is meant here by a "first item of information being positive" is that the detection system has actually detected the presence of water and/or of dirt on the exterior surface of the sensor/emitter.

If the control unit, after performing the second step, receives a second item of information corresponding to a situation in which the sensor/emitter is clean, the method comprises a third step during which the control unit sends a second instruction to the telescopic cleaning device which leads to the cleaning method being halted.

If, after performing the second step, the control unit receives a third item of information corresponding to a situation in which the detection system detects the presence of water and/or of dirt on the exterior surface of the sensor/emitter, the method then comprises a third step during which the control unit sends a third instruction to the telescopic cleaning device which leads to deployment of this telescopic cleaning device, spraying of the second fluid onto the exterior surface of the sensor/emitter then the spraying of the first fluid onto this exterior surface of the sensor/emitter, the method further comprising at least a fourth step during which the detection system checks for the presence of water and/or of dirt on the exterior surface of the sensor/emitter.

DETAILED DESCRIPTION OF THE DRAWINGS

Further features, details and advantages will become more clearly apparent from reading the detailed description given below by way of illustration and with reference to the following figures, in which:

FIG. 1 schematically illustrates a motor vehicle comprising a telescopic cleaning device according to the invention;

FIG. 2 schematically illustrates a radiator grille of the motor vehicle illustrated in FIG. 1, and into which the telescopic cleaning device according to the invention is incorporated;

Figure 5:
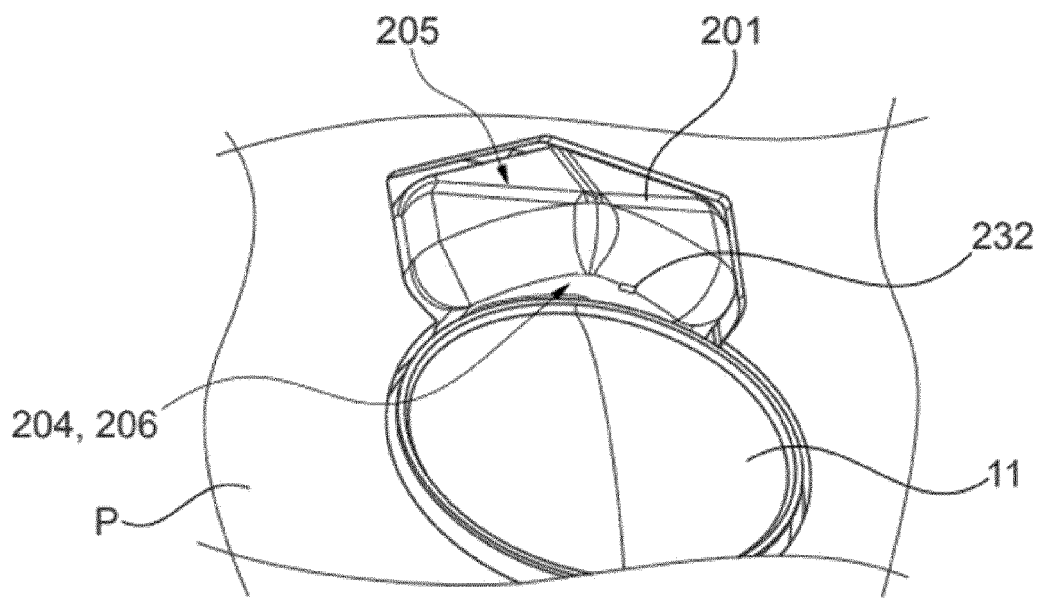
Figure 6:
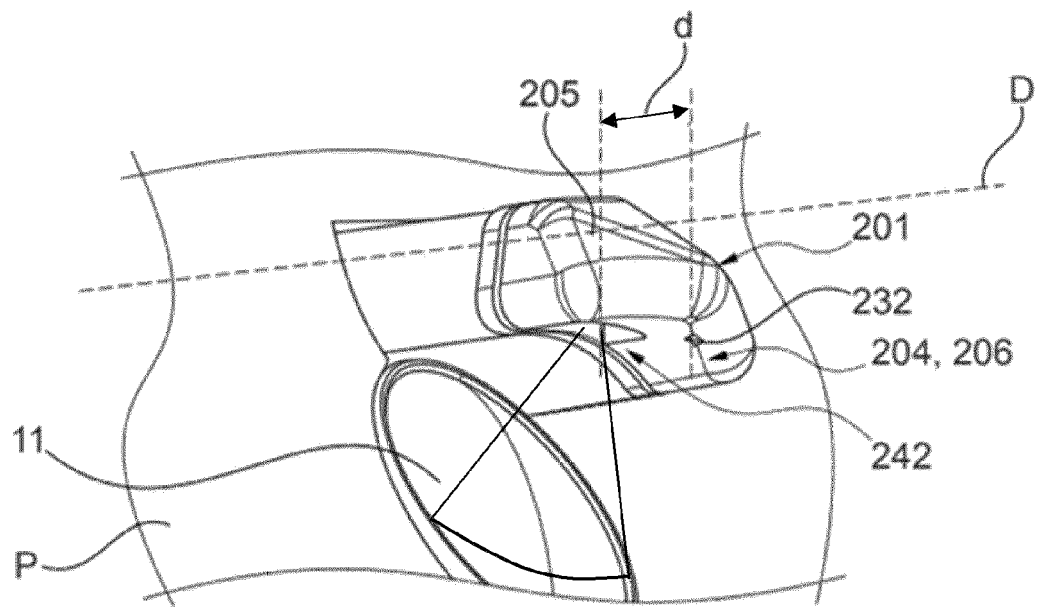
Figure 7:
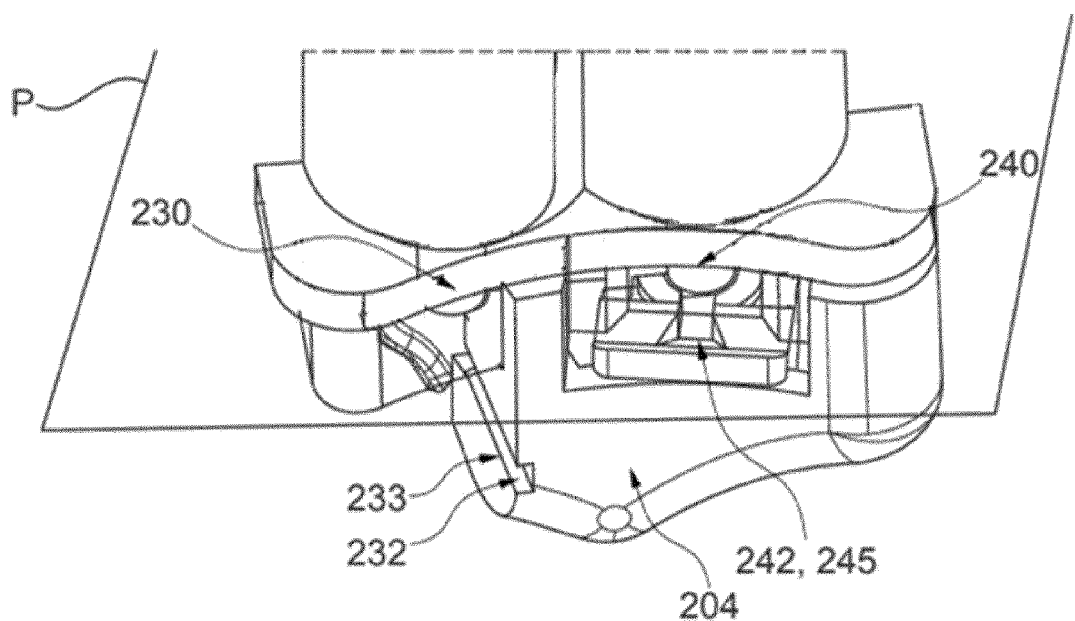
Figure 8:
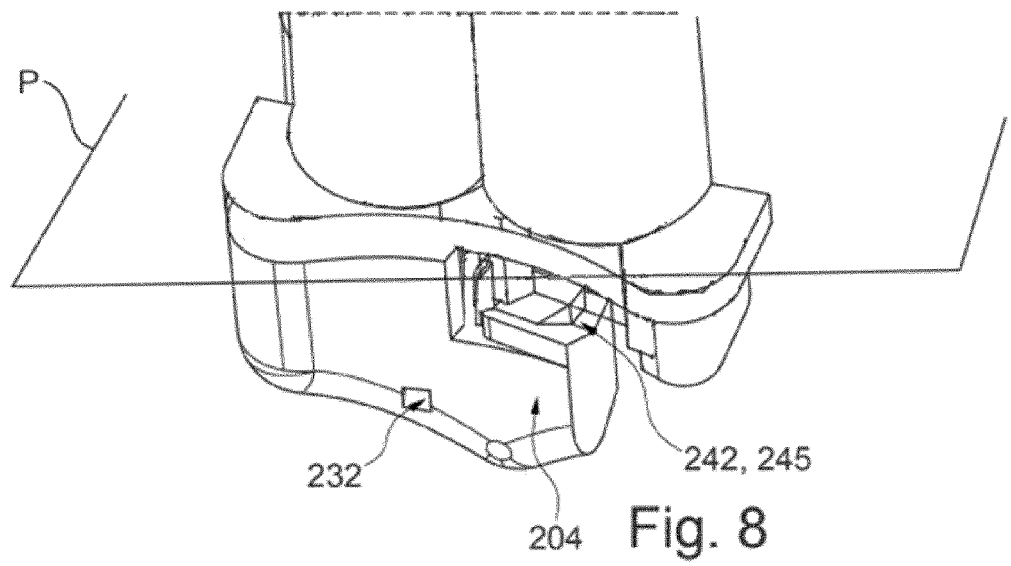
Figure 9:
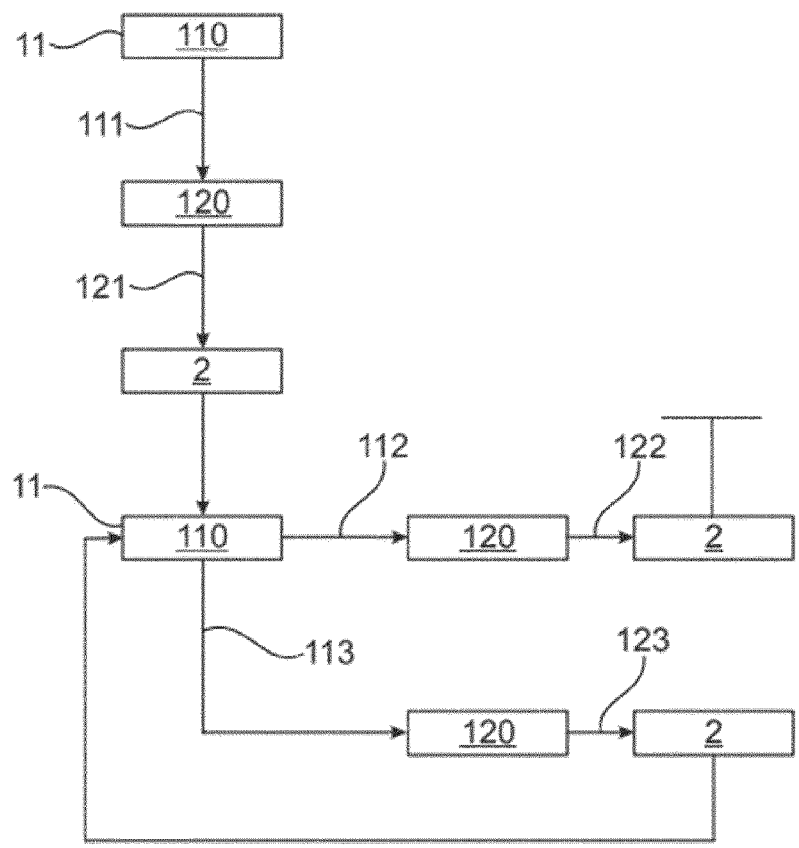

FIGS. 5 and 6 respectively illustrate a first position and a second position of the telescopic cleaning device according to the invention;

FIGS. 7 and 8 notably illustrate the distribution endpiece visible in FIGS. 5 and 6 and the surface of a bodywork element from which the cleaning device according to the invention may deploy as a projection, FIGS. 7 and 8 respectively illustrating the first position and the second position of FIGS. 5 and 6; and FIG. 9 illustrates, in the form of a block diagram, a cleaning method employing the telescopic cleaning device according to the invention.

DETAILED DESCRIPTION

Figure 1:
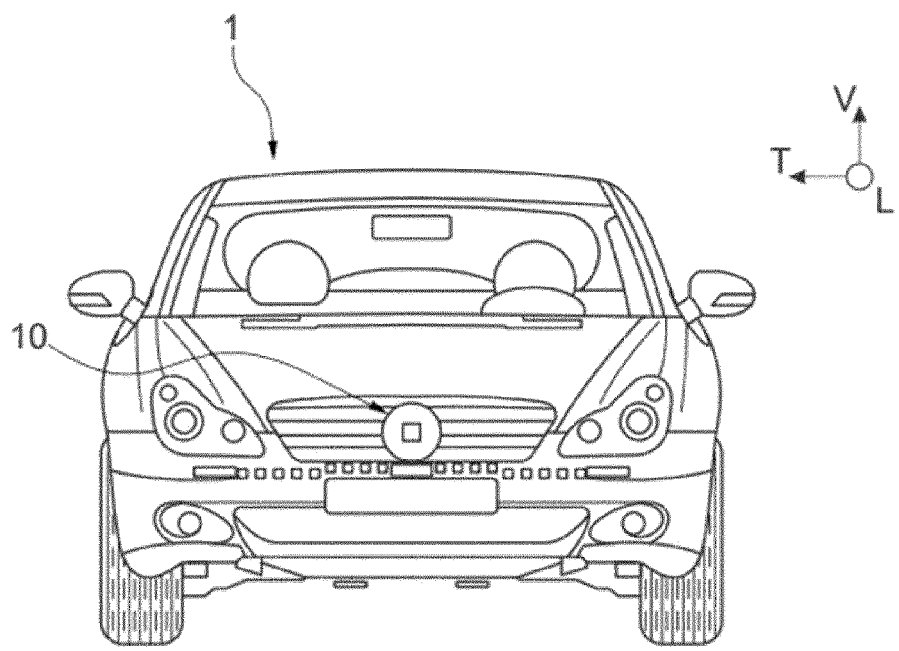
Figure 2:
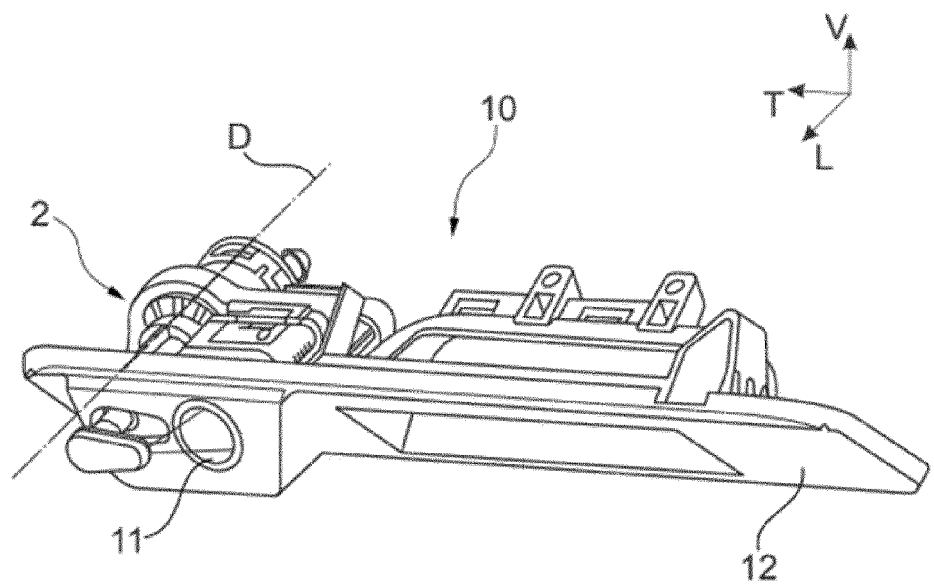
Figure 3:
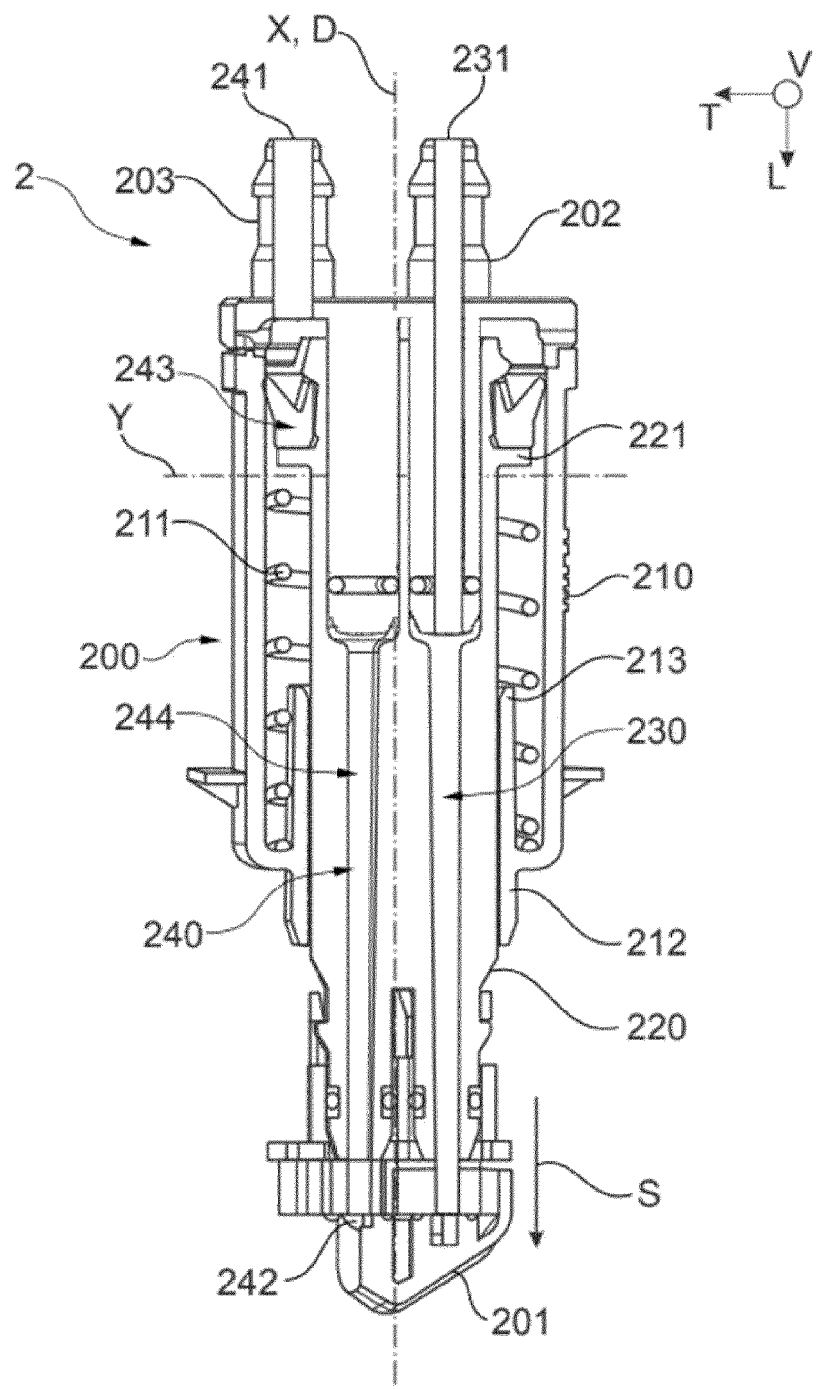
FIG. 3 depicts the telescopic cleaning device according to the invention, viewed in longitudinal section.

In the remainder of the description, the terms "longitudinal", "transverse" and "vertical" refer to an orientation of a telescopic cleaning device according to the invention when mounted on a motor vehicle and in respect of which reference may be made to the trihedron L, V, T illustrated in FIGS. 1 to 3. Thus, a longitudinal direction corresponds to a main direction of extension of this telescopic cleaning device, this longitudinal direction being parallel to a longitudinal axis L of the trihedron illustrated in the figures. A transverse direction corresponds to a direction parallel to a transverse axis T of the trihedron, this transverse axis T being perpendicular to the longitudinal axis L. A vertical direction corresponds to a direction parallel to a vertical axis V of the trihedron, this vertical axis V being perpendicular to the longitudinal axis L and to the transverse axis T.

FIG. 1 schematically illustrates a motor vehicle 1 which comprises a detection assembly 10 of a driving aid system. This detection assembly 10 comprises at least one sensor/emitter, for example a sensor/emitter as illustrated in FIG. 2, and a telescopic cleaning device according to the invention. In the example illustrated here, the detection assembly 10 is arranged on the front face of the vehicle 1, for example at the radiator grille. In the remainder of the description, the terms "telescopic cleaning device" and "cleaning device" will be used indiscriminately.

FIG. 2 thus illustrates an example of a detection assembly 10 which comprises the sensor/emitter 11 and the telescopic cleaning device 2 according to the invention, these respectively being housed in a support element 12 intended to be fixed to a structural element of the vehicle illustrated in FIG. 1, such as a radiator grille of this vehicle. The telescopic cleaning device 2 is configured to clean and/or dry the sensor/emitter 11. Of course, the detection assembly would still conform to the invention if it had a sensor/emitter 11 and an associated telescopic cleaning device 2 that were fixed directly to the structural element of the vehicle.

The telescopic cleaning device 2 extends predominantly in the longitudinal direction and it is configured to deploy along an axis of deployment D, parallel to this longitudinal direction. Thus, this telescopic cleaning device 2 is able to move between two extreme positions, these being the first position, also known as the "retracted position" and a second position, also known as the "deployed position", FIG. 2 illustrating the telescopic cleaning device in its second position. As illustrated, the axis of deployment D is perpendicular, or near-perpendicular, to a plane P in which the sensor/emitter 11 that is to be cleaned and/or to be dried predominantly lies, and more particularly to a plane in which an exterior surface of this sensor/emitter 11 predominantly lies. As will be explained in greater detail hereinafter, a fluid distribution endpiece is arranged at the free end of the telescopic cleaning device. In the retracted position, because the telescopic cleaning device is arranged in a housing formed in the structural element, the distribution endpiece is at least partially housed in the structural element, whereas in the deployed position, the distribution endpiece projects fully from the structural element.

According to the invention, the telescopic cleaning device 2 is able to spray on the one hand, a first fluid and, more particularly, air, and, on the other hand, a second fluid, and more particularly a cleaning liquid. As will be detailed far more fully hereinafter, the telescopic cleaning device 2 according to the invention is configured in such a way that, in its first position, the telescopic cleaning device is able to spray only the first fluid, namely to blow air, whereas in its second position, the telescopic cleaning device is able to spray the first fluid and the second fluid, namely to blow air and to spray cleaning liquid. In other words, if the spraying of air is enough, for example in rainy weather, to clean or to dry the sensor/emitter 11, and more particularly the exterior surface of this sensor/emitter 11, the cleaning device 2 remains in its first position, retracted into the structural element of the vehicle. By contrast, when more extensive cleaning is needed, and notably in dry weather with dirt or insects squashed onto the optical surface of the sensor/emitter, the cleaning device 2 is configured to deploy so as to allow, first of all, the spraying of cleaning liquid in order to clean the exterior surface of the sensor/emitter 11 when the cleaning device is in its deployed extreme position and then, in a second phase if necessary, to spray air, so as to dry the cleaning liquid sprayed beforehand, as the cleaning device returns to the retracted position. It will therefore be appreciated that, in its retracted position, the cleaning device 2 is able to dry the exterior surface of the sensor/emitter 11 or to pre-clean same, and that the cleaning device is actuated to adopt its deployed position only when more intensive cleaning of the optical surface of the sensor/emitter 11 is needed.

FIG. 3 is a view in longitudinal section of a first embodiment of a telescopic cleaning device 2 according to the invention.

The telescopic cleaning device 2 comprises a conveying body 200 of cylindrical overall shape and which extends predominantly in the longitudinal direction X. This conveying body 200 comprises a fixed part 210 and a moving part 220, the moving part 220 forming the piston sliding inside the cylinder formed by the fixed part 210. It will be appreciated that the moving part 220 is able to move along the axis of deployment D of the telescopic cleaning device 2. In other words, when mention is made of the "deployment of the cleaning device" that more particularly means "deployment of the moving part of the conveying body of the cleaning device", it being understood that in the remainder of the description these two expressions will be used indiscriminately. More specifically, the cleaning device 2 moves in a first direction of deployment in a sense S illustrated in FIG. 3 to adopt the deployed position and a second, opposite, retraction, sense, to return to the first position referred to as the retracted position.

Figure 4:
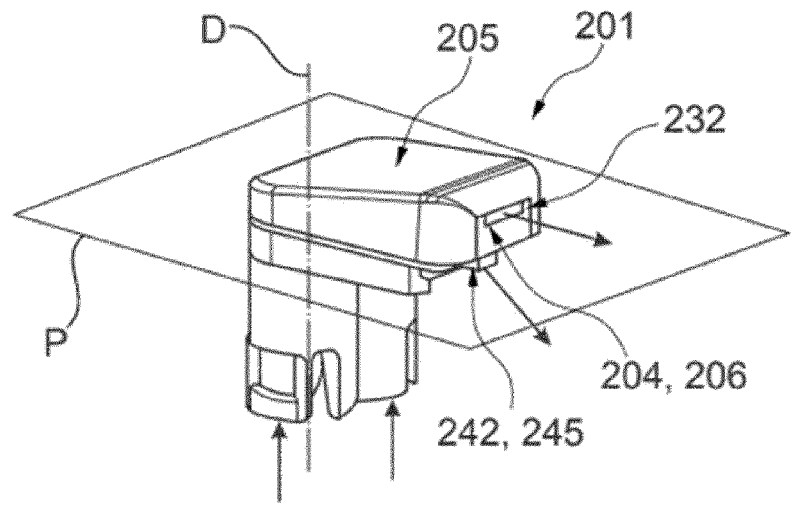
FIG. 4 is a schematic depiction of a distribution endpiece of the telescopic cleaning device, showing the difference in spray angle between the various fluids distributed by means of the endpiece.

As depicted, the conveying body 200 comprises at least a first duct 230 intended for conveying the first fluid from a first inlet orifice 231 as far as a first distribution orifice 232—for example visible in FIGS. 4 and 5—and at least a second duct 240 intended for conveying second fluid from a second inlet orifice 241 as far as a second distribution orifice 242. More particularly, the first distribution orifice 232 and the second distribution orifice 242 are formed in a distribution endpiece 201 which forms a free first longitudinal end of the conveying body 200 of the cleaning device 2, and which is positioned in the direct continuation of the free end of the piston formed by the moving part 220.

More particularly, the distribution endpiece 201 may adopt any shape suitable for the design of the vehicle in which the device is installed, provided that it comprises a spray face 204, visible in FIGS. 4 to 8, in which the distribution orifices 232, 242 are formed, the spray face being the face facing the optical surface that is to be cleaned. The distribution endpiece 201 also comprises a cover face 205, which corresponds to the axial end face of the endpiece and of the telescopic cleaning device. In the first position, only the terminal interface is fully visible, and the spray face 204 is partially withdrawn, a distal part 206 of the spray face 204 connected to the terminal end face extending out of the housing of the telescopic cleaning device. As will be described hereinafter, only the first distribution orifice is arranged in this distal part 206 of the spray face 204.

The opposite longitudinal end of the conveying body 200 is itself formed of a flange that closes the cylinder that forms the fixed part and comprises a first inlet tube 202 in which the first inlet orifice 231 is formed and a second inlet tube 203 in which the second inlet orifice 241 is formed. It will be appreciated that the first inlet orifice 231 is connected to a first reservoir containing the first fluid, for example compressed air, and the second inlet orifice 241 is itself connected to a second reservoir containing the second fluid, for example the cleaning liquid, the reservoir not having been depicted in the figures.

As illustrated, the first duct 230 and the second duct 240 are distinct and do not communicate, so the first fluid and the second fluid are never in contact.

The first inlet tube 202 is arranged longitudinally along the axis of the first duct 230, and a fluidtight duct guides the air admitted via the first inlet tube directly toward the first distribution orifice 232, whatever the deployment of the cleaning device. From this it will be appreciated that the first duct 230 is formed chiefly in the moving part 220 of the conveying body 200.

By contrast, the second inlet tube 203 is eccentric in relation to the second duct 240 so that the cleaning liquid admitted does not enter the second duct 240 directly. When the cleaning liquid is injected into the device, it first of all enters a buffer chamber 243, and the filling of this buffer chamber contributes to the application of a pressure to the piston formed by the moving part 220. From this it will be appreciated that the second duct 240 comprises a first portion 243 formed by the buffer chamber and which extends into the fixed part 210 of the conveying body 200, and a second portion 244 which extends into the moving part 220 of the conveying body 200 in parallel with the first duct 230. The first portion 243 of the second duct 240 is fluidically connected to the inlet orifice 241 for the second fluid and the second portion 244 of this second duct 240 for its part is fluidically connected to the second distribution orifice 242.

The buffer chamber 243 is delimited, longitudinally, by the closure flange bearing the inlet tubes and by a collar 221 which projects from a periphery of the moving part 220. In other words, the cleaning fluid entering this buffer chamber has a tendency to push on the piston that forms the moving part to cause it to move away from the inlet orifice and force it to deploy. It will be appreciated from FIG. 3 that the second portion 244 of the second duct 240 and the corresponding distribution orifice 242 is inaccessible to the second fluid as long as the cleaning device 2 is in the retracted position and that the fluid can circulate freely from the inlet orifice to the distribution orifice via the buffer chamber and the second duct when the cleaning device 2 according to the invention is in the deployed position.

An elastic return device 211 is housed between a wall of the cylinder forming the fixed part 210 and the face of the collar 221 that faces away from the buffer chamber 243. The elastic return device 211 is configured to compress progressively as the buffer chamber 243 associated with the second duct 240 gradually fills with the second fluid. It will be appreciated that it is the pressure exerted by this second fluid on the moving part 220, via the collar 221 created as a projection on the moving part 220, which compresses the elastic return device 211 and allows this moving part 220 to deploy, so that this part slides, in the sense S, thus rendering the second portion 244 of the second duct 240 accessible to the second fluid and thus allowing this second fluid to be sprayed via the second distribution orifice 242. It will be appreciated from what follows, when the second fluid is no longer injected into the device via the second inlet orifice, the elastic return device 211 seeks to allow the cleaning device 2 to retract, therefore causing the moving part 240 of the conveying body 200 to slide in a sense that is the opposite of the sense S of deployment so that the cleaning device 2 returns to its retracted position.

In the example illustrated in FIG. 3, one longitudinal end of the fixed part 210 of the conveying body 200 adopts the form of a guide sleeve 212 guiding the moving part 220 of this conveying body 200. In addition, one longitudinal end 213 of this sleeve 212 forms an end stop for the collar 221 formed as a projection of the moving part 210. Thus, the sliding of the moving part 220 with respect to the fixed part 210 is limited longitudinally by this end stop.

The first inlet orifice 231 may comprise a shut-off means—not depicted here—configured to adopt an open position in which it allows the first fluid to be admitted and to pass along the first duct in the direction of the first distribution orifice 232, notably when the device and the distribution endpiece is in the retracted first position, and a closed position in which it prevents the admission of air to the first duct 240, notably when the device and the distribution endpiece is in the deployed second position. Equivalently, the second inlet orifice 231 may comprise a shut-off means—not depicted here—configured to adopt an open position in which it allows the second fluid to be admitted and to pass along the second duct in the direction of the second distribution orifice 232, notably when the device and the distribution endpiece is in the deployed second position, and a closed position in which it prevents the admission of cleaning fluid into the device and notably into the second duct in order to maintain the device and the distribution endpiece in the retracted first position.

As will be described in fuller detail hereinafter, with reference to FIG. 9, the vehicle comprising the cleaning device 2 according to the invention also comprises at least one control unit configured to operate the opening and closing of this or these shut-off means.

According to the invention, and as notably illustrated in the schematic depiction of FIG. 4, the first distribution orifice 232 and the second distribution orifice 242 are offset from one another along the axis of deployment D of the telescopic cleaning device 2. In other words, an axial offset d measured between the first distribution orifice 232 and the second distribution orifice 242 parallel to this axis of deployment D has a non-zero value. This offset d is also visible in FIG. 6. Advantageously, the non-zero value of the offset d is comprised between two and thirty millimeters.

Furthermore, the axial offset between the first distribution orifice 232 via which the air for drying is able to exit and the second distribution orifice 242 via which a cleaning liquid is able to exit is organized in such a way that the second distribution orifice is situated closest to the fixed part of the device, the first distribution orifice being the orifice that projects furthest from the surface of the bodywork of the vehicle, namely from the plane P in which the exterior surface of the sensor/emitter 10 that is to be cleaned lies.

The magnitude of the axial offset is notably determined so that, in the first position, in which the distribution endpiece is at least partially withdrawn so that the second distribution orifice 242 is not visible and is hidden behind the surface of the bodywork, the first distribution orifice is itself uncovered and free of any obstruction for spraying air towards the cleaning surface. As illustrated schematically in FIG. 4, the first distribution orifice 232 is configured to generate at exit a jet of air that is substantially flat, namely substantially parallel to the surface of the bodywork. Advantageously, the first distribution orifice 232 is configured in such a way that a main direction of spraying of the first fluid forms an angle comprised between −10° and 10° with the plane in which the exterior surface of the sensor/emitter 11 that is to be cleaned predominantly lies.

It will be appreciated from the foregoing, namely from the axial offsetting of the distribution orifices, that the first distribution orifice 232 and the second distribution orifice 242 are both uncovered and free of any obstruction, which means to say outside the bodywork and distant from the plane P in which the exterior surface of the optical sensor/emitter that is to be cleaned lies, when the telescopic cleaning device 2 is in its second position referred to as its deployed position. It will also be appreciated that, in this second position, the arrangement of the first distribution orifice 232 generating a flat jet will not allow cleaning by the spraying of air to be effective and operational at this moment. As will be described hereinafter, the operation of drying by spraying air via the first distribution endpiece is performed as the device is returning to the retracted position, between the deployed second position and the retracted first position.

As illustrated schematically in FIG. 4, the second distribution orifice is configured to generate at exit a jet of cleaning liquid that is inclined with respect to the surface of the bodywork, in the direction of the latter, so as to spray the cleaning liquid onto the surface that is to be cleaned at an angle of impingement that is favorable for scouring the surface that is to be cleaned. More particularly, the second distribution orifice is configured in such a way that a main direction of spraying of the second fluid forms an angle comprised between 30° and 60° with the plane P in which the exterior surface of the sensor/emitter 11 that is to be cleaned predominantly lies, the angle being such that the jet of cleaning liquid is deflected toward this plane.

The distribution endpiece according to the invention is configured in such a way that the fluid outlets are staggered, which is to say arranged axially on either side of a plane of section perpendicular to the axis of deployment of the telescopic cleaning device, indicated schematically in FIG. 4. Further, the fluid outlets are configured so that the fluid respectively sprayed by each of these outlets extend on one side of this plane of section.

FIGS. 5 and 7 respectively illustrate the first position and the second position of the telescopic cleaning device 2 according to the invention. As previously mentioned, the first position differs from the second position in that, when the cleaning device is in the first position, only the first distribution orifice is uncovered so that the first fluid, that is to say the air, can be sprayed, whereas when the cleaning device is in the second position both orifices are uncovered notably so as to allow a spraying of the second fluid, which is the cleaning liquid, in this second position, then to allow a spraying of air to dry the optical surface of the residue of cleaning liquid, and more particularly as the device returns to the starting position.

In other words, when the cleaning device 2 is in its first position illustrated in FIG. 5, only one longitudinal end of the distribution endpiece 201 extends beyond the bodywork of the vehicle, namely beyond the plane P in which the exterior surface of the sensor/emitter 11 that is to be cleaned lies, and more particularly the cover face 205, together with the distal part 206 of the spray face 204 in which the first distribution orifice is formed. By contrast, when the cleaning device 2 is in its second position illustrated in FIG. 7, the entirety of the distribution endpiece 201 extends beyond the plane in which the exterior surface of the sensor/emitter 11 lies.

FIG. 6 also illustrates the axial offset d, of non-zero value, measured between the first distribution orifice 232 and the second distribution orifice 242. As previously mentioned, this offset d is measured parallel to the axis of deployment of the cleaning device. More specifically, this axial offset d is measured parallel to this axis of deployment, between a center of the first distribution orifice 232 and a center of the second distribution orifice 242.

Furthermore, a jet of cleaning liquid has been depicted by way of example in FIG. 6 in order to illustrate the inclination of the jet with respect to the optical surface that is to be cleaned. As has been able to be specified earlier, the jet of cleaning liquid leaving the distribution endpiece is at an angle of a value comprised between 30 and 60°. This spray angle is notably obtained through the presence of a ramp 245 placed in the path of the cleaning liquid leaving the second duct, as is notably visible in FIGS. 7 and 8.

These FIGS. 7 and 8 notably reveal a detail of the distribution endpiece 201 and the bodywork surface from which the device extends as a projection as it deploys telescopically, it being appreciated that these figures are views from the inside of the vehicle.

FIG. 7 illustrates the first position of FIG. 5, with only the first distribution orifice extending beyond the bodywork surface. The distribution endpiece has been depicted in partial section in order to reveal a circulation duct 233 connecting the first duct 230 to the first distribution orifice 232. The small passage cross section formed by this circulation duct allows air to be sprayed at a pressure that is effective for drying or for removing dirt. The first distribution orifice 232 is formed by the open end of the circulation duct 233 opening onto the spray face 204.

FIG. 8 illustrates the second position of FIG. 6, with both distribution orifices 231, 232 extending beyond the bodywork surface. The distribution endpiece has been depicted in partial section in order to reveal the ramp shape 245 created at the outlet of the second duct 240 at the level of the second distribution orifice 232.

And finally, FIG. 9 illustrates schematically, in the form of a block diagram, a cleaning method employing the cleaning device 2 according to the invention.

The sensor/emitter 11, of which the exterior surface can be cleaned and/or dried using the cleaning device 2 according to the invention, advantageously comprises a detection system 110 detecting the presence of water and/or of dirt.

Thus, when this detection system 110 actually detects the presence of water and/or of dirt on the exterior surface of the sensor/emitter 11, it sends a corresponding first item of information 111 to the vehicle control unit 120.

This control unit 120 then sends a first instruction 121 to the cleaning device 2 according to the invention so that the latter sprays the first fluid onto the exterior surface of the sensor/emitter 11, in this instance spraying air. There then follows a step in which the detection system 110 checks the condition of the exterior surface of the sensor/emitter 11. If it emerges from this checking step that the exterior surface of the sensor/emitter 11 is clean, then the detection system sends a corresponding second item of information 112 to the control unit 120 which can then transmit a second instruction 122 to the cleaning device 2, this second instruction 122 having the effect of terminating the cleaning method which will be resumed, as described, when the detection system 110 once again detects the presence of water and/or of dirt on this exterior surface of the sensor/emitter 11.

By contrast, if it emerges from the checking step that the exterior surface of the sensor/emitter 11 is not correctly cleaned, then the detection system 110 sends a corresponding third item of information 113 to the control unit 120. The control unit 120 is therefore configured to send a third instruction 123 to the cleaning device 2 so that the shut-off means of the second inlet orifice described earlier adopts its open position so as to allow this second fluid to reach the second duct and therefore allow the cleaning device to deploy and allow this second fluid, in this instance cleaning liquid, to be sprayed. If appropriate, another instruction is issued so that a spraying of the first fluid is performed, after the spraying of the second fluid, as the telescopic device is returning to the first position, so as to dry off the residue of the second fluid. There then follows a further step of checking by the detection system 110, which is similar to the checking step described above. It should be appreciated that the steps of spraying the cleaning liquid and of drying off this cleaning liquid may be performed as many times as necessary, namely that they are repeated until all, or almost all, of the water and/or dirt present on the exterior surface of the sensor/emitter has been removed.

The present invention thus offers a simple and inexpensive means that makes it possible to economize on cleaning liquid, notably through the possibility of performing a cleaning operation by blowing air without the telescopic device deployment mechanism being operated. This then saves on cleaning liquid and on unnecessary wearing of the mechanical device, but without the quality of the cleaning of the sensors/emitters present on the vehicle being adversely affected.

The invention is not limited to the means and configurations described and illustrated herein, however, and also extends to all equivalent means or configurations and to any technically operational combination of such means. In particular, the shape and the layout of the first distribution orifice and of the second distribution orifice may be modified without detriment to the invention, provided that they provide the functionalities described and illustrated in the present document.

What is claimed is:

1. A telescopic cleaning device for spraying at least a first fluid and at least a second fluid toward an exterior surface of a sensor/emitter of a motor vehicle, the telescopic cleaning device comprising:

a distribution endpiece in which at least one first distribution orifice for the at least first fluid and at least one second distribution orifice for the at least second fluid are arranged;

the telescopic cleaning device being configured to deploy along an axis of deployment (D) of the telescopic cleaning device; the telescopic cleaning device configured to deploy between a retracted first position and a deployed second position, wherein said first distribution orifice and said second distribution orifice are offset from one another along the axis of deployment (D);

said device configured such that in the retracted first position only said first distribution orifice is free.

2. The telescopic cleaning device of claim 1, configured such that in the deployed second position said first distribution orifice and said second distribution orifice are free.

3. The telescopic cleaning device of claim 1, comprising at least a first inlet orifice for the first fluid and at least a second inlet orifice for the second fluid, the first inlet orifice being connected to said first distribution orifice by a first duct and the second inlet orifice being connected to said second distribution orifice by a second duct distinct from the first duct.

4. The telescopic cleaning device of claim 1, comprising a conveying body which comprises at least one fixed part and one moving part, the distribution endpiece being formed at the end of the moving part.

5. The telescopic cleaning device of claim 1, wherein the first fluid is compressed air and wherein the second fluid is a cleaning liquid.

6. The telescopic cleaning device of claim 5, wherein said first distribution orifice associated with the compressed air is arranged in the distribution endpiece at a greater distance than said second distribution orifice associated with the cleaning liquid is.

7. The telescopic cleaning device of claim 1, wherein the distribution endpiece includes a spray face facing the sensor/emitter to be cleaned and in which said first and said second distribution orifices are arranged; and a cover face formed by an axial end face of the distribution endpiece and of the telescopic cleaning device;

the spray face being partially withdrawn in the retracted first position in order to leave said first distribution orifice formed in a distal part of the spray face free.

8. The telescopic cleaning of claim 1, wherein said first distribution orifice is configured to form a jet of first fluid substantially perpendicular to the axis of deployment of the telescopic cleaning device.

9. The telescopic cleaning device of claim 1, wherein said second distribution orifice includes a ramp configured to deflect the jet of second fluid leaving the distribution endpiece toward the surface of the sensor/emitter that is to be cleaned.

10. A telescopic cleaning device for spraying at least a first fluid and at least a second fluid toward an exterior surface of a sensor/emitter of a motor vehicle, the telescopic cleaning device comprising:

a distribution endpiece in which at least one first distribution orifice for the at least first fluid and at least a second distribution orifice for the at least second fluid are arranged;

the telescopic cleaning device being configured to deploy along an axis of deployment (D) of the telescopic cleaning device; the telescopic cleaning device configured to deploy between a retracted first position and a deployed second position, wherein said first distribution orifice and said second distribution orifice are offset from one another along the axis of deployment (D);

a spray face facing the sensor/emitter to be cleaned and in which said first and said second distribution orifices are arranged; and the spray face being partially withdrawn in the retracted first position in order to leave said first distribution orifice formed in a distal part of the spray face free.

* * * * *